3,278,590
Patented Oct. 11, 1966

3,278,590

PROCESS FOR PREPARING UNSATURATED ESTERS BY OXIDATION OF OLEFINS IN AN AROMATIC AMIDE SOLVENT

Duncan Clark and Colin Bertie Cotterill, Norton-on-Tees, England, assignors to Imperial Chemical Industries Limited, London, England, a corporation of Great Britain No Drawing. Filed July 22, 1963, Ser. No. 296,434
Claims priority, application Great Britain, July 31, 1962, 29,441/62
11 Claims. (Cl. 260—497)

This invention relates to the production of esters.

In U.S. application Serial No. 139,836, filed September 22, 1961 there is described and claimed a process for the production of unsaturated esters of carboxylic acids which comprises contacting ethylene with a palladium salt in a carboxylic acid either under substantially anhydrous conditions or in the presence of a minor amount of water, and in the presence of a carboxylate which is ionized under the reaction conditions and separating the reaction products from the reaction mixture. The process is preferably carried out in the presence of a redox system, particularly a compound of copper or iron, and of an alkali metal halide, preferably lithium chloride. It is a further preferred feature that the redox system is regenerated with molecular oxygen. The said process may be used for the production of vinyl acetate by using acetic acid as the carboxylic acid and an alkali metal acetate, for example lithium acetate, as the carboxylate.

Additionally, U.S. application Serial No. 139,835, filed September 22, 1961 describes and claims a similar process, covering however the use of higher alpha-olefines incorporating the structure $—CH=CH_2$ instead of ethylene. Suitable higher alpha-olefines are, for example, propylene and n-octene-1. These may be converted to products comprising appreciable amounts of primary esters.

The presence of water is detrimental to the production of esters, particularly vinyl esters, and particularly when the process is being carried out at an olefine partial pressure which is less than atmospheric. However, it has been found that the presence of water may be offset by incorporating in the reaction mixture one or more compounds selected from urea, acetamide, methylacetamide, dimethylacetamide, dimethylformamide, acetonitrile, benzonitrile, dialkyl sulphoxides, sulphones such as sulpholane, esters corresponding to the ester being produced (for example, when vinyl acetate is being produced an acetate ester such as benzyl acetate may be employed) and amines, provided that these do not react with the palladium salt under the reaction conditions, for example tri-n-propylamine. When using an olefine containing three or more carbon atoms as starting material, some of the compounds disclosed above have the advantage of improving the ratio of primary ester to secondary ester in the products obtained. This is an important feature because primary esters are in general more useful compounds than secondary esters.

We have now found that the process of the present invention may be carried out with advantage in the presence of an aromatic amide.

Thus, according to the present invention, there is provided a process for the production of unsaturated monoesters which comprises the step of contacting an olefine with a palladium salt, a carboxylate which is ionized under the reaction conditions and a redox system in a carboxylic acid, the said redox system being regenerated by means of molecular oxygen, the reaction being characterized in that 5 to 95% by weight of the reaction mixture is an aromatic amide.

The regeneration of the redox system by means of oxygen may be carried out in the ester-production zone by feeding a gas containing molecular oxygen to the said zone. For example, when ethylene is the olefine employed, this may be fed to the said zone in admixture with molecular oxygen. Alternatively, as described later, the redox system in a reduced form may be removed from the ester production zone and regenerated in a separate zone.

The term "aromatic amide" is intended to cover the amides both of carboxylic acids and of sulphonic acids. For example, it is possible to use the amide of benzoic acid or of benzene sulphonic acid or derivatives of these in which one or more alkyl, aryl, alkaryl or aralkyl groups is present as a substituent on the nitrogen atom or in the aromatic nucleus. Thus, N,N-dimethylbenzamide and N,N-dimethyl-p-toluene sulphonamide may be employed. It is also possible for the amide to contain alkoxy and cyano groups in the aromatic nucleus.

Olefines which may be used in the present process are ethylene, propylene and butenes, particularly n-butene-1 and n-butene-2. Higher aliphatic olefines, for example those containing from 5 to 12 carbon atoms, such as n-octene-1, and aryl-substituted olefines, such as styrene, may be used while oxygen-containing compounds also containing olefinic double bonds, for instance unsaturated acids and esters, are suitable starting materials. By the present process, ethylene and propylene may be converted to products comprising vinyl acetate and allyl acetate respectively.

The present process may be carried out at any suitable elevated temperature, temperatures in the range of 60 to 160° C. being suitable and those in the vicinity of 100° C. being preferable. The reaction may be carried out at atmospheric or elevated pressures. In particular, the use of olefine partial pressures of greater than atmospheric is advantageous, especially when the olefine contains at most four carbon atoms. Olefine partial pressure of up to 50 atmospheres or more may be employed.

Particularly when operating at total pressures in the region of atmospheric, but, also, to a lesser extent, at elevated olefine partial pressures, it is desirable that the reaction mixture should contain as little water as possible without having to resort to methods which are uneconomic or laborious and in particular it is desirable to use reactants which are substantially anhydrous. Furthermore, steps are taken as the reaction proceeds for the removal of water formed. Water removal is facilitated by the use of a high gas rate, that is to say a gas rate of at least 50 liters per hour per liter of reaction mixture, which tends to remove water by entrainment; by carrying out the reaction using the reaction mixture in the form of a film; by removing water by physical means such as distillation; by introducing into the reaction system a compound which removes water by reacting with it, for example acetic anhydride; or by circulating the reaction mixture through two zones, in the first of which the olefine is contacted with the reaction mixture and from which ester product is separated and in the second of which oxygen is contacted with the reaction mixture substantially free from ester product to re-oxidize the redox system, water being separated from the reaction mixture in the second zone.

In the present process, carbonyl compounds may be formed as by-products. For example, when using ethylene as the starting material, acetaldehyde may be formed. The presence of the amide of an aromatic acid diminishes the amount of carbonyl compound formed. Additionally, if an olefine is employed in which two different directions of attack are possible, the presence of an aromatic amide favors the formation of primary rather than secondary esters. This is important because primary esters are technically more useful than secondary esters. The presence of an aromatic amide also diminishes the amount of diester formed and this is again advantageous because, in general, di-esters are less valuable products than mono-esters.

The preferred palladium salt for use in the process of the present invention is palladous chloride, but other palladium salts such as palladous bromide and palladous acetate are suitable. Fluorides of palladium are however unsuitable for use. It is also possible to use metallic palladium initially, this being converted to a palladium salt as the reaction proceeds. It is preferable to react in the presence of an alkali metal halide, notably lithium chloride, or of an alkaline earth metal halide, for example magnesium chloride.

Organic or inorganic redox systems may be employed in the present process. Suitable organic redox systems include para-benzoquinone, duroquinone and 2-ethylanthraquinone. Cupric salts, such as cupric chloride and cupric acetate, are particularly suitable inorganic materials but ferric salts may also be used. It is possible to use two or more of these redox systems in conjunction.

Oxygen may be introduced into the reaction mixture as a stream of the substantially pure gas, or in an air, or as a mixture of oxygen with an inert gas such as nitrogen, or, if the olefine is sufficiently volatile, in the form of an oxygen-olefine or an air-olefine mixture.

Either the carboxylic acid or the carboxylate which is ionized and usually both will correspond to the ester which it is desired to produce. Thus, when producing an acetate, either acetic acid or an acetate capable of being ionized must be present, and in particular it is desirable to employ both. Of the carboxylates capable of ionization which may be employed, those derived from the alkali metals are the most convenient. For example, lithium and sodium salts are particularly suitable for use in the invention. These may be produced in situ, for instance by adding the corresponding metal carbonate to the reaction mixture already containing carboxylic acid.

A wide range of carboxylic acids and carboxylates may be used in the present process. For example, it is possible to use lower-aliphatic mono-carboxylic acids, such as acetic acid and propionic acid, or higher acids such as n-hexanoic acid. Aliphatic dicarboxylic acids such as adipic acid may be used. Again, aromatic mono-carboxylic acids such as benzoic acid and aromatic dicarboxylic acids such as terephthalic acid are suitable. By the use of a dicarboxylic acid, acid esters and esters in which both carboxyl groups have been esterified may be formed.

The esters produced by the process of the present invention have numerous uses. Vinyl esters such as vinyl acetate, for example, are suitable in the production of polymers, which in turn may be used for the production of paints.

*Example 1*

A solution was made up as follows:

| | Grams |
|---|---|
| Palladous chloride | 1.07 |
| Lithium chloride | 2.1 |
| Lithium acetate | 13.2 |
| Cupric acetate | 18.1 |
| N,N-dimethlbenzamide | 133.0 |
| Acetic acid | 67 |

The temperature of the solution was raised to 105° C. and a gas comprising by volume 33% oxygen and 67% ethylene was circulated through it as a rate of 40 liters per hour. The exit gas line from the reactor contained successively for the recovery of products a water condenser, two cold catchpots and two bubblers containing aqueous hydroxylamine hydrochloride. As ethylene and oxygen were absorbed, fresh oxygen-ethylene mixture having a composition as defined above was admitted to the gas circulation system from a graduated aspirator, which enabled the uptake of ethylene to be determined. The reaction was stopped after 17 hours. The material condensed by the water condenser, the contents of the cold catchpots and the reactor liquid were analyzed for vinyl acetate, acetaldehyde and ethylidene diacetate. The contents of the bubblers were titrated with standard sodium hydroxide solution to determine the amount of acetaldehyde absorbed. The total amount of ethylene absorbed was 0.46 mole.

The quantities of product obtained and their yields based on the amount of ethylene absorbed are given in the table below.

| | Amount, mole | Yield, percent |
|---|---|---|
| Vinyl acetate | 0.187 | 41.1 |
| Acetaldehyde | 0.083 | 18.2 |
| Ethylidene diacetate | 0.003 | 0.6 |

The reaction was repeated using 200 ml. of acetic acid instead of 133 grams of N,N-dimethylbenzamide and 67 grams of acetic acid. The total amount of ethylene absorbed was 0.25 mols. The quantities of products obtained and their yields based on the amount of ethylene absorbed are given in the table below:

| | Amount, mole | Yield, percent |
|---|---|---|
| Vinyl acetate | 0.019 | 7.6 |
| Acetaldehyde | 0.159 | 64.0 |
| Ethylidene diacetate | 0.057 | 23.0 |

*Example 2*

A solution was made up as follows:

| | Grams |
|---|---|
| Palladous chloride | 0.88 |
| Lithium chloride | 0.7 |
| Lithium acetate | 10.9 |
| Cupric acetate | 5.7 |
| N,N-dimethyl-p-toluenesulphonamide | 110 |
| Acetic acid | 55.5 |

This solution was reacted with an ethylene-oxygen mixture at atmospheric pressure as described in Example 1. The duration of the reaction was 17 hours 45 minutes and 0.42 mole of ethylene was absorbed. The quantities of products obtained and their yields based on the amount of ethylene absorbed were:

| | Amount, mole | Yield, percent |
|---|---|---|
| Vinyl acetate | 0.173 | 41.2 |
| Acetaldehyde | 0.126 | 30.0 |
| Ethylidene diacetate | 0.034 | 8.2 |

We claim:

1. In a process for the production of an unsaturated mono-ester wherein an olefine and oxygen are introduced into a reaction mixture containing:

(a) a carboxylic acid selected from the group consisting of aliphatic and aromatic mono- and di-carboxylic acids;
(b) a soluble alkali metal salt of said carboxylic acid;
(c) a soluble palladium salt other than a fluoride; and
(d) a redox system selected from the group consisting of cupric salts, ferric salts, parabenzoquinone, duroquinone and 2-ethylanthraquinone and the quantity of water present in said reaction mixture is limited to allow said unsaturated mono-ester formation; the improvement which comprises including in said reaction mixture, from 5% to 95%, based on the total weight of the reaction mixture, of a benzene amide selected from the group consisting of benzamide, N,N-dimethyl benzamide and N,N-dimethyl p-toluene sulphonamide.

2. A process according to claim 1 wherein the benzene amide is N,N-dimethyl benzamide.

3. A process according to claim 1 wherein the benzene amide is N,N-dimethyl p-toluene sulphonamide.

4. A process according to claim 1 wherein the alkali metal salt is selected from the group consisting of lithium and sodium salts of said carboxylic acid.

5. A process according to claim 1 wherein the palladium salt is selected from the group consisting of palladous chloride, palladous bromide and palladous acetate.

6. A process according to claim 1 carried out at a temperature in the range of 60° to 160° C.

7. A process according to claim 1 carried out using an elevated olefine partial pressure of up to 50 atmospheres.

8. A process according to claim 1 carried out in the presence of a halide selected from the group consisting of alkali metal and alkaline earth metal halides.

9. A process according to claim 8 wherein the halide is selected from the group consisting of lithium chloride and magnesium chloride.

10. In a process for the production of an unsaturated mono-ester of acetic acid wherein oxygen and an olefine containing at most 12 carbon atoms are introduced into a reaction solution consisting essentially of:

(a) acetic acid;
(b) an alkali metal acetate;
(c) a palladium salt selected from the group consisting of palladous chloride, palladous bromide and palladous acetate; and
(d) a redox system selected from the group consisting of cupric and ferric salts; and the quantity of water present in said reaction solution is kept as low as possible to allow said ester formation;

the improvement which comprises including in said reaction solution, from 5% to 95%, based on the total weight of the reaction mixture, of an amide selected from the group consisting of benzamide, N,N-dimethyl benzamide and N,N-dimethyl p-toluene sulphonamide; said solution being at a temperature of 60° to 160° C. and the olefine partial pressure being an elevated pressure up to 50 atmospheres.

11. A process according to claim 10 wherein the olefine is ethylene.

References Cited by the Examiner

FOREIGN PATENTS

| | | |
|---|---|---|
| 608,610 | 3/1962 | Belgium. |
| 137,511 | 4/1960 | U.S.S.R. |

OTHER REFERENCES

Smidt: Angew. Chem., vol. 71, pages 176–182 (1959).

Smidt: Chemistry and Industry, Jan. 13, 1962, pages 54–61.

Moiseev: Doklady Adademii Nauk SSSR, vol. 133, pp. 377–80 (1960).

Kharasch: J.A.C.S., vol. 60, pages 882–4 (1960).

LORRAINE A. WEINBERGER, *Primary Examiner.*

LEON ZITVER, *Examiner.*

D. P. CLARKE, B. M. EISEN, V. GARNER, *Assistant Examiners.*